United States Patent [19]

MacFarlane, Jr.

[11] 4,131,591
[45] Dec. 26, 1978

[54] MINERAL-FILLED NYLON MOLDING COMPOSITIONS EXHIBITING LOW CREEP

[75] Inventor: Robert MacFarlane, Jr., Fanwood, N.J.

[73] Assignee: Allied Chemical Corporation, Morristown, N.J.

[21] Appl. No.: 828,356

[22] Filed: Aug. 29, 1977

Related U.S. Application Data

[63] Continuation-in-part of Ser. No. 717,851, Aug. 26, 1976, abandoned.

[51] Int. Cl.$^2$ ............................................. C08L 77/02
[52] U.S. Cl. .................................................. 260/37 N
[58] Field of Search ..................................... 260/37 N

[56] References Cited

U.S. PATENT DOCUMENTS 3,419,517  12/1968  Hedrick et al. .................... 260/37 N
3,778,407  12/1973  Hild et al. .......................... 260/37 N
3,846,367  11/1974  Burton ............................... 260/37 N
3,931,094   1/1976  Segal et al. ........................ 260/37 N Primary Examiner—Lewis T. Jacobs
Attorney, Agent, or Firm—Henry E. Naylor

[57] ABSTRACT

Polyamide molding compositions comprising a polyamide resin, about 5 to 40 percent by weight, based on the total weight of the compositions, of talc in the form of platy fine particles having a surface are of about at least about $7^2$m/g; about 2 to 40 percent by weight, based on the total weight of the composition, of wollastonite; and about 5 to 25 percent by weight, based on the total weight of the composition, of fiber glass. Preferably, about 0.1 to 4 weight percent, based on the weight of the wollastonite, of a coupling agent is present. These molding compositions are capable of providing molded articles having a creep slope of $\leq 0.15$ percent strain per log time.

40 Claims, No Drawings

MINERAL-FILLED NYLON MOLDING COMPOSITIONS EXHIBITING LOW CREEP

CROSS REFERENCE TO RELATED APPLICATION

This is a continuation-in-part of U.S. application Ser. No. 717,851 filed Aug. 26, 1976, now abandoned.

BACKGROUND OF THE INVENTION

Field of the Invention

This invention relates to nylon molding compositions which provide molded articles exhibiting low creep.

Description of the Prior Art

It is known in the art to reinforce polyamide materials with various reinforcing fillers such as asbestos, wollastonite, silica, glass and the like. See, for example, U.S. Pat. No. 3,419,517 to Hedrick et al. 91968) and U.S. Pat. No. 3,846,367 to Burton (1967). Such molding compositions have been utilized to mold a variety of products. However, a need exists for a nylon molding composition which provides molded articles that exhibit low creep at elevated temperatures as well as possess the requisite tensile and flexural properties necessary for specific applications. One such application is in the area of exterior automotive parts such as an automotive headlight retainer; in such instance, the composition must be capable of forming parts having smooth surfaces which permit painting and finishing into what is commonly referred to in the industry as "Class A" surfaces.

SUMMARY OF THE INVENTION

It has now been found that the incorporation of specified amounts of a talc having certain physical properties, wollastonite, and glass fiber into a polyamide composition produces molding compositions which are capable of providing a molded article having a creep slope value of $\leq 0.17$. In accordance with this invention, there is provided a polyamide molding composition comprising a polyamide and, in approximate percentages by weight based on the total weight of the composition, 5 to 40 percent of talc in the form of platy fine particles having a surface area of at least about 7 square meters per gram; 2 to 40 percent of wollastonite; and 5 to 25 percent of fiber glass. Preferably, the composition also contains about 0.1 to 4 weight percent, based on the weight of wollastonite, of a coupling agent.

The compositions of this invention provide molded articles having excellent creep resistance at elevated temperatures as well as other physical properties. It has been found that other grades of talc, such as coarser particle size talc, or talc containing substantial quantities of asbestos, do not provide the desired creep resistance and other properties. It has been further found that the wollastonite is also necessary to provide the desired creep resistance, and that the fiber glass is necessary to provide additional creep resistance, tensile strength and a high heat distortion temperature.

DESCRIPTION OF THE PREFERRED EMBODIMENT

The polyamides which may be utilized in accordance with this invention include any of the known polyamides which have recurring amide linkages (—CONH—) as part of their main polymer chain. Such polyamides include the polylactams, exemplified by polycaprolactam (nylon 6), and the polyamides formed by the condensation of dicarboxylic acids with diamines, such as polyhexamethylene adipamide (nylon 6,6). Other conventional polyamides which can be employed herein include nylon 6,10; nylon 6,12 and the like and mixtures of one or more of the above polyamides. The preferred polyamide is nylon 6.

The talc, which is a magnesium silicate, is utilized in an amount of about 5 to 40 weight percent, preferably about 10 to 30 weight percent, more preferably about 15 to 25 weight percent. When used herein, unless otherwise indicated, weight percent is based on the total weight of the composition. The talc is in the form of platy particles and has a surface area of at least about 7 square meters per gram, and preferably about 8 to 11 square meters per gram. The surface area, which is a measurement of the particle size, is determined from standard gas-adsorption measurements using nitrogen gas in accordance with the BET theory (Brunauer, Emmett and Teller, J. Am. Chem. So., Vol. 60, p. 309, 1938); this is commonly designated as $N_2$,BET. Preferably, the talc particles are predominantly in the form of plate-like particles; that is, at least about 80% of the particles are platy as opposed to whisker shaped or acicular. It is also preferred that the talc be substantially free of soda ($Na_2O$); that is, the soda content preferably is less than about 1 percent by weight. Also, it is preferred to use substantially asbestos-free talc owing to environmental considerations. Substantially asbestos free means less than about 1.0 wt. % based on the total weight of talc plus asbestos.

An example of one such talc material which has been found eminently suitable for use in the present invention is Mistron Frost P, available from Cyprus Industrial Minerals Company in regular or compacted form. This material has the following typical physical properties:

| | |
|---|---|
| Apparent Density, lgs/ft$^3$ | |
| Loose (Scott Volumeter) | 8 |
| Tapped (Numinco) | 21 |
| Specific Gravity | 2.8 |
| Oil Absorption, g/100g talc | |
| ASTM D281 (rub-out) | 43 |
| ASTM D1483 (Gardner-Coleman) | 76 |
| Surface Area, m$^2$/g ($N_2$,BET) | 9 |
| Hegman Fineness of Grind | 6 |
| Median Particle Size, Microns | 2.25 |
| Particle Size Distribution | |
| % minus 20 microns | 100 |
| % minus 10 microns | 98 |
| % minus 5 microns | 85 |
| % minus 2 microns | 44 |
| % minus 1 microns | 13 |
| % minus 0.5 microns | 2 |

This talc has a chemical analysis of 26% MgO, 58% $SiO_2$, 6% CaO, 1% $Al_2O_3$, 1% $K_2O$ and ½% $Fe_2O_3$. Asbestos-like minerals are not detected by X-ray diffraction. When the amount of talc employed is less than about 5 percent, the creep resistance is adversely affected; if the amount of talc is above about 40 percent, the composition becomes difficult to process.

Wollastonite, which is an acicular calcium metasilicate, is present in the compositions of this invention in an amount of about 2 to 40 weight percent, preferably about 2 to 20 weight percent, more preferably about 5 to 10 weight percent. Amounts below about 2 weight percent do not provide the necessary creep resistance whereas amounts above about 40 percent do not provide noticeable increases in creep resistance. Preferably, the wollastonite is pretreated with a coupling agent.

The coupling agents useful in this invention may be any of the generally known coupling agents. Among the coupling agents which may be employed herein are the organosilanes, organotitanates such as isopropyl tri(diisooctylphosphato)titanate, isopropyl tri(dioctylphosphto)titanate and the like, resoles which are the condensation polymerization reaction products formed from an excess of formaldehyde and any of phenol, resorcinol or mixtures thereof (see U.S. Pat. No. 3,899,462 to Newbould et al. issued 1975), etc. Silane coupling agents are preferred and suitable compounds are disclosed, for example, in aforementioned U.S. Pat. No. 3,419,517. Of the silanes, aminosilanes, such as gamma aminopropyltriethoxysilane and N-beta(N-vinylbenzylaminoethyl)-gamma aminopropyltrimethoxy silane hydrochloride; epoxysilanes and vinyl silanes are preferred. The purpose of the coupling agent is to effectively bond the wollastonite to the polyamide. The coupling agent is preferably present in an amount of about 0.1 to 4 weight percent, more preferably about 0.25 to 2 weigh percent, based on the weight of the wollastonite. Preferably, the silane or other coupling agent is coated directly on the wollastonite prior to the inclusion of the wollastonite into the nylon. Alternatively, the coupling agent may be coated on the nylon or added to the nylon when the wollastonite is added.

The fiber glass is present in an amount of about 5 to 25 weight percent, preferably about 7 to 20 weight percent, more preferably about 14 to 17 weight percent. Although any suitable form of fiber glass may be employed, such as continuous filament, mat, roving, chopped strand and the like, chopped strand of about 1/16 to ¼ inches in length is preferred.

The composition may be prepared utilizing standard mixing equipment. Preferably, the nylon is in pellet or powder form and all of the components may be blended in a drum tumbler, farrel continuous mixer or the like and then melt blended togther in an extruder, such as a single or twin screw extruder, and pelletized. Alternatively, various components may be preblended. The composition preferably is in the form of a uniform blend of pellets and is suitable for use in forming articles in injection molding and other conventional molding machines.

Creep slope as used herein is defined as the percent of creep strain per log time in hours, wherein creep strain is the total strain (extension plus initial gape length) at any given time produced by the applied stress during a creep test and its measurement is set forth in ASTM D 2990. The creep properties of the molding composites of the instant invention were measured according to ASTM D 2990 at 830° C and at 4000 psi. Preferably, the polyamide molding compositions of the present invention have a creep slope of less than about 0.17 percent strain per lap time when molded, more preferably less than about 0.15 when molded and most preferably less than about 0.10 when molded.

To further illustrate the present invention, the following non-limiting examples are given. All parts and percentages are by weight unless otherwise indicated.

EXAMPLE 1

A molding composition comprising 60 percent nylon 6, 15 percent of Mistron Frost P talc, 15 percent of a commercial grade of wollastonite (P-4 available from Malvern Minerals), 5 percent of ⅛ inch chopped fiber glass strand and 1 percent of gamma aminopropyltriethoxysilane (based on the weight of wollastonite) was prepared by charging the nylon, talc and wollastonite which was previously coated with the silane into a drum tumbler and tumbling at room temperature for 15 to 30 minutes. The fiber glass was then added and the tumbling was continued for an additional 3 to 5 minutes. The mixture was fed to a single screw 2½ inch extruder and extruded at a barrel temperature of 530° F and at a rate of 30 pounds per hour in the form of ⅛ inch filament which was thereafter pelletized in a conventional manner.

Test samples were prepared in a Van Dorn injection molding machine at a melt temperature of 580° F, mold temperature of 200° F, an injection pressure of 600 psi, and with a 15 second injection time and a 15 second dwell time in the mold.

The resulting samples were tested for various physical properties which are reported in Table 1, below, under Example 1. Of particular interest is the exceptionally low creep slope and low creep intercept measured in accordance with ASTM D-2990-71. Creep is the dimensional change with time of a material under load. The creep intercept is the value of the percent strain (increase in length divided by the original length) at one hour. Creep slope is the increase in the percent strain over time on a logarithmic basis.

EXAMPLES 2–4

Example 1 was repeated except that the amounts of talc, glass and wollastonite were varied. The results are shown in Table 1 under Examples 2–4.

EXAMPLES 5–6 (Comparative)

Examples 1–4 were repeated except that the talc employed was Penn talc from Pennsylvania Mineral and Mining Company. This is a coarser grade of talc than the Mistron Frost, with 96% passing through a 325 mesh screen. Such talc has the following chemical analysis: 71.39% $SiO_2$, 14.11% $Al_2O_3$, 4.36% $K_2O$, 3.43% $Fe_2O_3$, 1.51% MgO, 2.21% $Na_2O$, 0.30% $TiO_2$ and 0.11% CaO. The results are shown in Table 1 under Examples 5 and 6. As can be seen from the Table, the substitution of a coarser grade of talc containing relatively large amounts of $Na_2O$ (as well as alumina) resulted in a much increased creep intercept and slope, indicating that the creep resistance of the comparative examples was inferior.

EXAMPLE 7 (Comparative)

Example 1 was repeated except that no wollastonite was used and the talc and fiber glass were present in amounts of 30 percent and 10 percent, respectively. The results are shown in Table 1 under Example 7. As is shown, the creep resistance is impaired by the removal of the wollastonite and the other physical properties are also adversely affected.

EXAMPLE 8 (Comparative)

Example 1 was repeated except that no wollastonite was used, the talc was Desertalc 57 available from Johns-Manville, and was present in an amount of 30 percent and the fiber glass was present in an amount of 10 percent. This particular talc had the following physical properties:

| | |
|---|---|
| Apparent Density, lbs/ft³ | |
| loose (Scott Volumeter) | 13–15 |
| Average Particle Size (50% finer), microns | 3.08 |
| Specific Gravity | 2.84 |
| Surface Area, approximate, m²/g ($N_2$,BET) | 5 |
| Particle shape | acicular-platy |

This talc had the following chemical analysis: 59.43% $SiO_2$, 26.16% MgO, 0.43% $Al_2O_3$, 0.28% $Fe_2O_3$, 5.09% CaO, 2.44% $Na_2O$, 1.56% $K_2O$ and 0.014% $TiO_2$. The results are shown in Table 1, under Example 8.

As can be seen, the absence of wollastonite and the use of a coarser particle size talc (containing relatively large amounts of soda) adversely affected the physical properties, including creep resistance.

tions for desired purposes. These include lubricants (e.g., stearates), pigments, heat and light stabilizers, other fillers and the like. It has been found, however, that the substitution of other mineral fillers, such as Dawsonite, an alumina fiber filler, for wollastonite yields compositions which exhibit inferior creep resistance and other physical properties.

TABLE 1

| Example | Talc Type | Talc % | Glass, % | Wollastonite % | UTS, psi × 10⁻³ | UE, % | Creep Intercept %/log time | Creep Slope %/log time | Flexural Strength psi × 10⁻³ | Flexural Modulus psi × 10⁻⁵ | HDT, °C. | Gardner Impact, in-lb |
|---|---|---|---|---|---|---|---|---|---|---|---|---|
| 1 | M | 15 | 15 | 10 | 16.0 | 2.22 | 1.63 | .095 | 24.0 | 12.5 | 202 | 15.4 |
| Comp. a | M | 25 | 10 | 5 | 12.9 | 1.77 | 3.58 | .229 | 19.6 | 10.1 | 191 | 13.9 |
| 2 | M | 20 | 15 | 5 | 15.0 | 2.33 | 1.96 | .112 | 21.7 | 12.3 | 200 | 20.2 |
| Comp. b | M | 20 | 10 | 10 | 13.9 | 2.16 | 3.18 | .223 | 20.7 | 11.0 | 191 | 19.0 |
| Comp. c | P | 25 | 10 | 5 | 12.0 | 2.04 | 5.56 | .608 | 17.1 | 7.4 | 131 | 28.4 |
| Comp. d | P | 15 | 15 | 10 | 14.2 | 4.26 | 3.53 | .177 | — | — | — | — |
| 3 | M | 30 | 10 | 0 | 14.8 | 1.74 | 2.68 | .171 | 18.8 | 11.9 | 200 | 14.1 |
| Comp. e | D | 30 | 10 | 0 | 14.7 | 2.06 | 2.89 | .176 | 19.7 | 10.4 | 197 | 23.1 |

Notes
M = Mistron Frost P
P = Penn Talc
D = Desertalc 57 containing from 30–40 wt % asbestos
UTS = Ultimate Tensile Strength
UE = Ultimate Elongation
HDT = Heat Distortion Temperature at 264 psi.
Creep is measured per ASTM D-2990 at 83° C, 4000 psi.

EXAMPLE 9

A molding composition similar to that employed in Example 1 was used to mold headlight retainers for vehicle headlights in an inject molding machine. The headlight retainers were tested for their ability to retain the accuracy of the headlight aim under stress and under elevated temperatures at the desired level in accordance with standard automotive industry procedures. Briefly, this procedure involves mounting a headlight in the retainer, aiming the headlight at a point 25 feet distant, raising the surrounding temperature to 83° C. for 24 hours, and retesting the aim after cooldown. The headlight retainers performed satisfactorily in such procedure (deflection of less than 2 inches). Moreover, when painted they exhibited a Class A surface.

EXAMPLE 10

Example 1 is repeated utilizing nylon 6,6 as the polyamide. Similar results are obtained.

As pointed out above, the present invention provides polyamide molding compositions which are moldable into parts having excellent creep resistance, tensile, flexural and impact properties. If desired, other conventional additives may be incorporated in the composi-

EXAMPLES 11–18

Example 1 was repeated except that the amounts of nylon, talc, glass and wollastonite were varied. The results are shown in Table 2.

TABLE 2

| Example | Talc Type | Talc % | Glass, % | Wollastonite % | UTS, psi × 10⁻³ | UE, % | Creep Intercept %/log time | Creep Slope %/log time | Flexural Strength psi × 10⁻³ | Flexural Modulus, psi × 10⁻⁵ | HDT, °C. | Gardner Impact, in-lb |
|---|---|---|---|---|---|---|---|---|---|---|---|---|
| Comp. f | M | 15 | 10 | 5 | 12.2 | 3.93 | 5.20 | 0.241 | 20.92 | 8.6 | 189 | 29.6 |
| Comp. g | M | 15 | 10 | 10 | 13.7 | 3.28 | 4.05 | 0.199 | 22.36 | 9.6 | 194 | 29.1 |
| 4 | M | 15 | 15 | 5 | 14.7 | 2.92 | 2.64 | 0.105 | 23.57 | 10.8 | 195 | 24.6 |
| 5 | M | 15 | 15 | 10 | 16.0 | 2.22 | 1.63 | 0.095 | 24.06 | 12.5 | 202 | 15.4 |
| Comp. h | M | 25 | 10 | 5 | 12.9 | 2.77 | 3.58 | 0.229 | 19.55 | 10.1 | 191 | 13.9 |
| 6 | M | 25 | 10 | 10 | 13.6 | 2.80 | 3.16 | 0.147 | 21.19 | 11.9 | 194 | 22.0 |
| 7 | M | 25 | 15 | 5 | 14.4 | 2.49 | 2.38 | 0.113 | 22.47 | 13.1 | 200 | 18.2 |
| 8 | M | 25 | 15 | 10 | 15.1 | 1.50 | 2.71 | 0.082 | 22.47 | 14.9 | 0 | 0.0 |
| 9 | M | 10 | 12 | 40 | | | | 0.09 | | | | |

Notes
M = Mistron Frost P
UTS = Ultimate Tensile Strength
UE = Ultimate Elongation
HDT = Heat Distortion Temperature at 264 psi.
Creep is measured per ASTM D-2990 at 83° C, 4000 psi.
1. Data obtained from mathematical model.

From the data set forth in Table 2, it is possible to calculate by standard statistical analysis the effect of changes in individual components or combination of components upon creep slope.

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

I claim:
1. A polyamide molding composition comprising:
    (a) polyamide resin;
    (b) about 5 to 40 weight percent, based on the total weight of the composition, of substantially asbestos free talc in the form of platy fine particles having a surface area of at least about .7 m²/g;

(c) about 2 to 40 weight percent, based on the total weight of the composition, of wollastonite; and
(d) about 5 to 25 weight percent, based on the total weight of the composition, of fiber glass; wherein the ingredients in the composition, are present in proportion to one another such that the composition after molding, has a creep slope of less than about 0.17 percent strain per log time.

2. The molding composition of claim 1 wherein the polyamide is polycaprolactam.

3. The molding composition of claim 1 wherein the talc is present in an amount of about 10 to 30 weight percent.

4. The molding composition of claim 1 wherein the talc comprises particles of which at least 80% are of a platy nature.

5. The molding composition of claim 1 wherein the talc contains less than about 1% of $Na_2O$.

6. the molding composition of claim 1 wherein the talc particles have a surface area of about 8 to 11 $m^2/g$ ($N_2$, BET).

7. The molding composition of claim 1 wherein the wollastonite is present in an amount of about 2 to 20 weight percent.

8. The molding composition of claim 1 wherein the fiber glass is present in an amount of about 7 to 18 weight percent.

9. The molding composition of claim 1 including about 0.1 to 4 weight percent, based on the weight of wollastonite, of a coupling agent.

10. The molding composition of claim 9 wherein the coupling agent is a silane compound.

11. The molding composition of claim 10 wherein the silane compound is gamma aminopropyltriethoxysilane and is present in an amount of about 0.25 to 2 weight percent, based on the weight of wollastonite.

12. The molding composition of claim 1 wherein the polyamide is polycaprolactam and containing about 10 to 30 weight percent talc, about 2 to 20 weight percent wollastonite and about 7 to 18 weight percent fiber glass, and 0.1 to 4 weight percent, based on the weight of wollastonite, of a silane coupling agent.

13. The molding composition of claim 12 wherein the wollastonite is pretreated with said coupling agent.

14. The molding composition of claim 1 having a creep slope of less than about 0.15 percent strain per log time when molded.

15. A molded article formed from the composition of claim 12 and having a creep slope of less than about 0.15 percent strain per log time.

16. A polyamide molding composition comprising:
(a) a polyamide resin;
(b) about 15 to 25 weight percent, based on the total weight of the composition, of substantially asbestos free talc in the form of platy fine particles having a surface area of at least 7 $m^2/g$;
(c) about 5 to 10 weight percent, based on the total weight of the composition, of wollastonite; and
(d) about 14 to 16 weight percent, based on the total weight of the composition, of fiber glass; wherein the ingredients in the composition, are present in proportion to one another such that the composition after molding, has a creep slope of less than about 0.17 percent strain per log time.

17. The molding composition of claim 16 wherein said polyamide is polycaprolactam.

18. The molding composition of claim 16 wherein the talc comprises particles of which at least 80% are of a platy nature.

19. The molding composition of claim 16 wherein the talc contains less than about 1% of $Na_2O$.

20. The molding composition of claim 16 wherein the talc particles have a surface area of about 8 to 11 $m^2/g$ ($N_2$, BET).

21. The molding composition of claim 16 including about 0.1 to 4 weight percent, based on the weight of wollastonite, of a coupling agent.

22. The molding composition of claim 21 wherein the coupling agent is a silane compound.

23. The molding composition of claim 22 wherein the silane compound is gamma aminopropyltriethoxysilane and is present in an amount of about 0.25 to 2 wt. %, based on the weight of wollastonite.

24. The molding composition of claim 23 wherein the wollastonite is pretreated with the coupling agent of claim 21.

25. The molding composition of claim 16 having a creep slope of less than about 0.15 when molded.

26. A molded article formed from the composition of claim 21 and having a creep slope of about 0.05 to 0.10 percent strain per log time.

27. A polyamide molded composition comprising:
(a) polyamide resin;
(b) about 5 to 40 weight percent, based on the total weight of the composition of substantially asbestos free talc in the form of platy fine particles having a surface area of at least about 7 $m^2/g$;
(c) about 2 to 40 weight percent, based on the total weight of the composition, of wollastonite; and
(d) about 5 to 25 weight percent, based on the total weight of the composition, of fiber glass; wherein the ingredients in the composition, are present in proportion to one another such that the composition after molding, has a creep slope of less than about 0.17 present strain per log time.

28. The molded composition of claim 27 wherein the polyamide is polycaprolactam.

29. The molded composition of claim 27 wherein the talc is present in an amount of about 10 to 30 weight percent.

30. The molded composition of claim 27 wherein the talc comprises particles of which at least 80% are of a platy nature.

31. The molded composition of claim 27 wherein the talc contains less than about 1% $Na_2O$.

32. The molded composition of claim 27 wherein the talc particles have a surface area of about 8 to 11 $m^2/g$ ($N_2$, BET).

33. The molded composition of claim 27 wherein the wollastonite is present in an amount of about 2 to 20 weight percent.

34. The molded composition of claim 27 wherein the fiber glass is present in an amount of about 7 to 18 weight percent.

35. The molded composition of claim 27 including about 0.1 to 4.0 weight percent, based on the weight of wollastonite, of a coupling agent.

36. The molded composition of claim 35 wherein the coupling agent is a silane compound.

37. The molded composition of claim 36 wherein the silane compound is gamma aminopropyltriethoxysilane and is present in an amount of about 0.25 to 2 weight percent, based on the weight of wollastonite.

38. The molded composition of claim 27 wherein the polyamide is polycaprolactam and containing about 10 to 30 weight percent talc, about 2 to 20 weight wollastonite and about 7 to 17 percent fiber glass, and 0.1 to 4.0 weight percent, based on the weight of wollastonite, of a silane coupling agent.

39. The molded composition of claim 27 wherein the creep slope is less than about 0.15.

40. The molded composition of claim 39 wherein said molded composition is an automotive headlight retainer.

* * * * *